US008095972B1

(12) United States Patent
Floyd et al.

(10) Patent No.: US 8,095,972 B1
(45) Date of Patent: Jan. 10, 2012

(54) SECURE AUTHENTICATION FOR WEB-BASED APPLICATIONS

(75) Inventors: Gregory R. Floyd, McDonough, GA (US); Steaven A. Rowe, Milton, GA (US); Michael Peters, Lilburn, GA (US)

(73) Assignee: Southern Company Services, Inc., Atlanta, GA (US)

( * ) Notice: Subject to any disclaimer, the term of this patent is extended or adjusted under 35 U.S.C. 154(b) by 559 days.

(21) Appl. No.: 12/246,251

(22) Filed: Oct. 6, 2008

(51) Int. Cl.
*G06F 17/30* (2006.01)
(52) U.S. Cl. .......................................................... 726/9
(58) Field of Classification Search ....... 709/9; 713/185
See application file for complete search history.

(56) References Cited

U.S. PATENT DOCUMENTS

| | | |
|---|---|---|
| 5,944,824 A | 8/1999 | He |
| 6,243,816 B1 | 6/2001 | Fang et al. |
| 6,601,233 B1 | 7/2003 | Underwood |
| 6,826,696 B1 | 11/2004 | Chawla et al. |
| 7,016,875 B1 | 3/2006 | Steele et al. |
| 7,155,614 B2 | 12/2006 | Ellmore |
| 7,225,462 B2 | 5/2007 | Bass et al. |
| 7,231,661 B1 | 6/2007 | Villavicencio et al. |
| 7,246,230 B2 | 7/2007 | Stanko |
| 2003/0177121 A1 | 9/2003 | Moona et al. |
| 2004/0128393 A1* | 7/2004 | Blakley et al. ................. 709/229 |
| 2004/0168066 A1 | 8/2004 | Alden |
| 2004/0249885 A1 | 12/2004 | Petropoulakis et al. |
| 2005/0125677 A1* | 6/2005 | Michaelides ................. 713/185 |
| 2005/0257247 A1 | 11/2005 | Moriconi et al. |
| 2006/0075224 A1 | 4/2006 | Tao |

FOREIGN PATENT DOCUMENTS

| | | |
|---|---|---|
| JP | 2005346570 | 12/2005 |
| JP | 2006236281 | 9/2006 |

OTHER PUBLICATIONS

Hillenbrand, M. et al., "A Single Sign-On Framework for Web-Services-based Distributed Applications", Telecommunications, 2005. ConTe12005. Proceedings of the 8th International Conference on vol. 1, Jun. 15-17, 2005 pp. 273-279.*

(Continued)

*Primary Examiner* — Kambiz Zand
*Assistant Examiner* — Abiy Getachew
(74) *Attorney, Agent, or Firm* — Womble Carlyle Sandridge & Rice, LLP (57) ABSTRACT

A method, system, and computer readable medium for facilitating user authentication for accessing an application hosted on an external web site by users in an enterprise network. A request is received from a user a request is received from a user to access the application on the external web site. The user is redirected to a secure web page on an enterprise server to log in to the enterprise server. Authentication information for the user is formatted in compliance with a login specification for the application hosted on the external web site. The authentication information is encrypted in compliance with the login specification for the application hosted on the external web site. The user is then directed to the application hosted on the external web site, wherein the user can access the application without having to reenter login information.

32 Claims, 6 Drawing Sheets

OTHER PUBLICATIONS

Samar V., "Single Sign-On Using Cookies for Web Application", Enabling Technologies: Infrastructure for Collaborative Enterprises, 1999. (WET ICE '99) Proceedings. IEEE 8th International Workshops on Jun. 16-18, 1999, pp. 156-163; Digital Object Identifier 10.1109/ENABL. 1999.805192.*

"Web Oriented, Mobile-code based Client-Server Single Sign-On Mechanism"; disclosed by IBM; Mar. 14, 2005 UTC; English (U.S.).
Hillenbrand, M. et al., "A Single Sign-On Framework for Web-Services-based Distributed Applications", Telecommunications, 2005. ConTel 2005. Proceedings of the 8th International Conference on vol. 1, Jun. 15-17, 2005 pp. 273-279.

* cited by examiner

Reset Password

Error Summary

- The application you are accessing requires your password to satisfy the following requirements, which your password does not meet. Your password:
  - » Expires on a periodic basis
  - » Must contain at least n characters
  - » Must contain both alphabetic and numeric characters
  - » Must contain both upper and lower case letters
  - » Must not be a word in the dictionary
  - » Must not be previously used, i.e., if you have used a password at any time in the past, you may not use it again
  - » Must not contain more than n contiguous repeating characters
  - » Must contain one or more non-printable characters, such as the Tab character

- Password has expired. Please enter a new password.

Password ________________

Confirm password ________________

Submit

FIG. 3

Reset Password

Error Summary

- Password is required
- Password confirmation is required
- The passwords do not match
- Error saving password. Please try again.

Please enter your new password and confirm to complete the reset process.

Password ______________

Confirm password ______________

Submit

FIG. 4

| APPMGR_APPLICATION | | | | |
|---|---|---|---|---|
| APPL_ID | APPL_NAME | APPL_TYPE | RETURN_TYPE | RETURN_URL |
| 7 | Event | Hosted | Querystring | https://secure.perfect.com/WebSite/Login/autologin.aspx |
| 8 | HRM | Hosted | Querystring | https://hrm.enterprise.com/cwweb/inbox.jsp |

| APPMGR_HOSTED_APPLICATION | | | | |
|---|---|---|---|---|
| APPL_ID | CIPHER_DESC | CIPHER_FORMAT_TXT | DATE_FORMAT_TXT | TOKEN_FORMAT_TXT |
| 7 | TripleDES | Base64Encoded | MMddyyyyHHmmss | SID\|EXPIRATION\|EMAIL |
| 8 | TripleDES | Base64Encoded | MMddyyyyHHmmss | USERNAME\|EXPIRATION\|NAMESPACE\|SID\|EMAIL |

FIG. 6B

| APPMGR_HOSTED_APPLICATION |
|---|
| ENCRYPTION_KEY_TXT |
| 6/mEz7fYBx4PzFd8Yjujq3tEgdaWSJsSzo6a7C7aCxn0YxYX0burCuSpDpQdlHvpLo8dw3shCOJo= |
| 69JZa5VngD40DvMap3IdZSthCnUDALbmlkAolbrNI0RscvUwxHzOdb8ajFmOGFf8Do8dw3shCOJo= |

FIG. 6C

| APPMGR_HOSTED_APPLICATION | | | |
|---|---|---|---|
| HASH_TXT | PADDING_TXT | MODE_TXT | INIT_VECTOR_TXT |
| None | PKCS7 | CBC | |
| None | PKCS7 | CBC | 6GjOIf6m2LRJpICMAtk5V0KPHcN7IQjia |

| FIG. 6A | FIG. 6B | FIG. 6C |
|---|---|---|

SECURE AUTHENTICATION FOR WEB-BASED APPLICATIONS

BACKGROUND OF THE INVENTION

Embodiments of the invention relate generally to sign-on procedures for software applications on a computer network and, more particularly, to methods and systems for user authentication for web-based applications in a corporate wide area network.

Authentication and authorization are two basic computer security concepts. In general, authentication refers to verifying the identity of a user attempting to gain access to a computing resource or system, and authorization refers to granting an authenticated user permission to access the resource or system, at least to a degree. There are many methods and protocols for performing authentication, each with various advantages and disadvantages. For example, authentication may be performed using cleartext password methods, hashed password methods, challenge-response methods, or any of many other types of methods.

One common denominator of authentication methods is that they require the user to provide some type of information or perform some action. For example, a user may be required to provide a password, provide biological data such as a retinal scan, provide personal data such as a handwriting sample, provide a number computed based on a synchronized clock in the user's possession, etc. Of course, what then occurs with the provided information varies for different authentication protocols. For example, the user's password may be sent to the system in encrypted form, the user's password may be used as a variable in a mathematical function to compute a value which is then sent to the system, etc.

One major problem which users face is that as they attempt to interact with multiple systems or multiple resources within a system, they are often required to provide authentication information multiple times. This imposes practical problems to users, such as having to remember or store multiple passwords, having to have a synchronized clock currently in their possession, etc., as well as the frustrating workflow problems of being interrupted to type in a password, etc. A concept known as "single sign-on" aims to address these types of problems. The idea behind single sign-on is that a user is authenticated once, in response to providing information or performing an action as described above, and then further authentication procedures are performed transparently to the user as he attempts to access other systems or resources.

The issue of authentication may, of course, be considered at many different levels. For example, authentication may be considered at a system level, such as when a system such as a Windows NT or Unix system verifies that a user attempting to logon has a valid user account and has provided a valid password. Authentication may also be considered at a system resource level. For example, an application which a user attempts to launch may authenticate the user, or an application may authenticate the user when he attempts to open a particular file, etc. In the case of application-level authentication, the application may utilize a protocol or method of its own, and/or authentication data of its own, to perform the authentication process, or the application may rely on system-level authentication services or protocols for authenticating the user.

Most efforts to enable single sign-on have approached the problem by attempting to incorporate system-level authentication services or protocols into the computing environments in question. Kerberos is one well-known example of this type of approach. In the Kerberos approach, a user provides authentication information to a Kerberos server. In response, the Kerberos server grants the user a ticket-granting ticket. The user may then present this ticket-granting ticket to a ticket-granting server in order to get a server ticket. This server ticket may then be used to access resources such as applications. Other attempts to enable single sign-on by building it into the system level include IBM Corporation's KryptoKnight and Axent Technologies Inc.'s Enterprise Resource Manager.

Such approaches to single sign-on generally aim to provide a comprehensive, very secure authentication infrastructure able to provide system-wide authentication services for applications and other resources. While this may seem ideal, there are several disadvantages involved. For example, in order to introduce this type of single sign-on capability to an existing system, the system may have to be modified significantly. For example, the Kerberos approach may require the Kerberos server, the ticket-granting server, etc. to be set up. Additionally, user machines may need to be modified with special client-side software for the system's authentication protocol. Once the necessary modifications have been made to a system, there is the problem of how to define the authentication logic for the system. For example, many systems comprise multiple servers in different locations. System administrators must decide which of these servers the single sign-on policy applies to, which users the policy applies to, etc.

Assuming that the system's single sign-on policy can be adequately defined and supported by the authentication infrastructure; and that any necessary modifications can be made to applications and other resources in order to take advantage of the authentication services, the problem of system interoperability remains. For example, if a user of the system attempts to access an application on a separate system, the user may need to be authenticated again, even if the separate system has single sign-on capabilities of its own.

Focusing now on networked applications, such as web-based applications or other Internet or Intranet applications, the problems described above are magnified. Many networked applications require users to be authenticated, e.g. by entering a username and password on a login screen. As networked applications become increasingly interconnected, it becomes more desirable to enable single sign-on capabilities for them. For example, it may be desirable to enable a user of a web-based application to launch a second application, e.g., by clicking on a hypertext link, and have the second application launch immediately, bypassing an interactive authentication process that the user may normally have to perform when launching the second application.

Single sign-on approaches such as the ones described above may be unsuitable for integrating networked application authentication processes. For example, a developer of a networked application may wish to enable single sign-on to a large number of other networked applications, each of which may run on different systems. It may be impossible or infeasible to make the types of modifications described above to each system. Assuming this obstacle can be surmounted, other obstacles may remain, such as installing any necessary client software on each user's machine, defining the access rights of users who connect to a system via a network connection, etc. If a networked application were ported to a new system or a new server within a system, various steps in this process may have to be repeated.

SUMMARY

Embodiments of the invention are directed to a common secure web authentication for web applications. The web authentication tool provides a common secure login process for all internal and external web applications. Embodiments of the invention provide one login to access all of a large enterprise's web applications. Embodiments of the invention also provide a way to determine if a user accessing enterprise web applications is logged in and secure. If the user is not, then the user will be redirected to a common login screen that will provide a link to register the user if the user has not done so previously.

In an exemplary embodiment, a method, system, and computer readable medium are provided for facilitating user authentication for accessing an application hosted on an external web site by users in an enterprise network. In the method, a request is received from a user to access the application on the external web site. The user is redirected to a secure web page on an enterprise server to log in to the enterprise server. Authentication information for the user is formatted in compliance with a login specification for the application hosted on the external web site. The authentication information is encrypted in compliance with the login specification for the application hosted on the external web site. The user is then directed to the application hosted on the external web site, wherein the user can access the application without having to reenter login information.

The system includes a plurality of components that perform the steps of the method when operated on a computer system. The computer readable medium has computer instructions embedded therein, the computer readable medium implementing the method when operated on the computer system.

BRIEF DESCRIPTION OF THE DRAWINGS

These and other advantages and aspects of the embodiments of the invention will become apparent and more readily appreciated from the following detailed description of the embodiments taken in conjunction with the accompanying drawings, as follows.

DETAILED DESCRIPTION

The following description is provided as an enabling teaching of embodiments of the invention. Those skilled in the relevant art will recognize that many changes can be made to the embodiments described, while still obtaining the beneficial results. It will also be apparent that some of the desired benefits of the embodiments described can be obtained by selecting some of the features of the embodiments without utilizing other features. Accordingly, those who work in the art will recognize that many modifications and adaptations to the embodiments described are possible and may even be desirable in certain circumstances, and are a part of the invention. Thus, the following description is provided as illustrative of the principles of the embodiments of the invention and not in limitation thereof, since the scope of the invention is defined by the claims.

In addition to a common secure login, the embodiments disclosed provide a number of capabilities including, but not limited to: (1) a single web authentication token which uniquely identifies a user; (2) a web site to be used by administrators in the various support centers to centrally manage identities; (3) various components for calling applications to retrieve information about a logged-in user; (4) a web site for existing customers to login, new customers to register, and a method for existing users to change their password; and (5) a terms of service page that must be accepted by all first-time users.

Users can include internal employees and external customers who use the enterprise web applications remotely through the Internet. The web authentication tool features include the following: (1) provide a common, secure, web login; (2) provide a highly available web login; (3) provide a secure means to register a new user; (4) provide a user with a single login identity for all web applications; and (5) provide a common security model across all web applications.

The Web Authentication tool was written to be a "Single Sign-On" solution (SSO) for a complete Enterprise Authentication solution. There is one common login site that every application uses for login. The site is on the enterprise's external web farms and can be leveraged by internal and external applications.

Once authenticated, a security token representing the user's identity is stored in the browser session. The security token identifies the user as a valid user during his visit to the website. The encryption and expiration of that token is centrally managed by the Web Authentication tool which knows how to check the values. All applications use this common form of identity. The token itself can contain an Active Directory or any qualifying system identity and is not limited to any specific type. The security token will be set to expire after a fixed period, e.g., 8 hours. After this period, an attempt to reuse the token will cause the user to be redirected to the login page. The login site could have a security certificate set to only allow 128-bit encrypted communication with the site.

Figure 1:
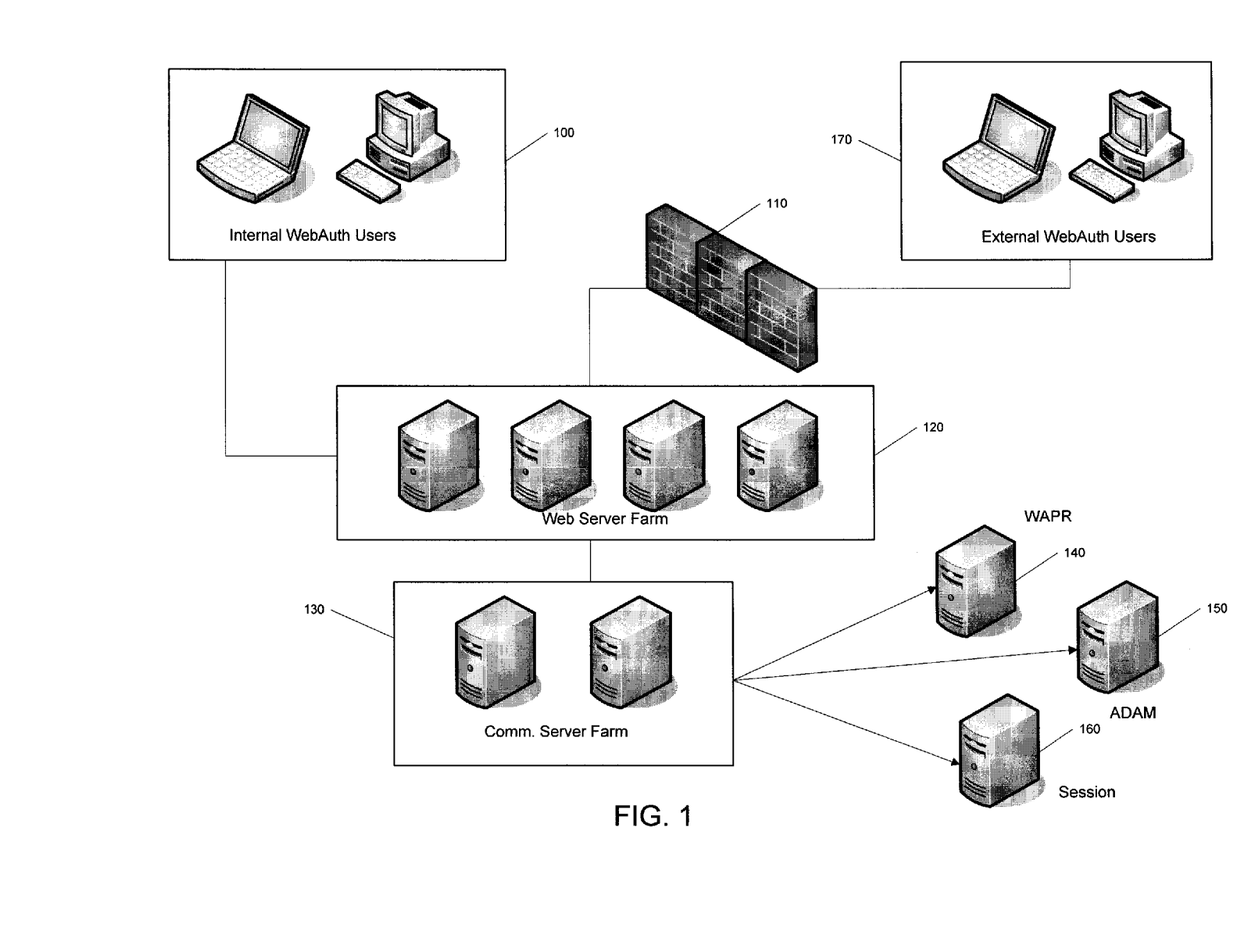
FIG. 1 illustrates a web authentication architecture diagram in accordance with an exemplary embodiment.

FIG. 1 illustrates a web authentication architecture diagram in accordance with an exemplary embodiment. The diagram depicts internal web authentication users 100 connecting directly to a web server farm 120, and external web authentication users 170 connecting to the web server farm 120 through a firewall 110. The web server farm 120 is operationally connected to a communication server farm 130 which in turn, is connected operationally to application servers 140, 150, 160.

The login site is platform-independent and uses basic HTTP GET and POST functions for integration into calling applications. The login screen is customizable to the calling application's look and feel. The application also can specify user requirements for login (e.g., "Employees Only"). Each registering user must comply with the terms of service upon registering.

The databases have failover in order to meet high availability requirements. The sites run on a web server farm and are monitored through a script on each site that performs unit tests frequently. This script is called from an external system to ensure approximately 99.99% uptime. The web site uses components that talk to the database (the web site cannot directly communicate with the database, but only through highly-secured components). All websites using the Web Authentication tool must run under Secure Sockets Layer (SSL). The Web Authentication tool supports multiple password strength levels.

Figure 3:
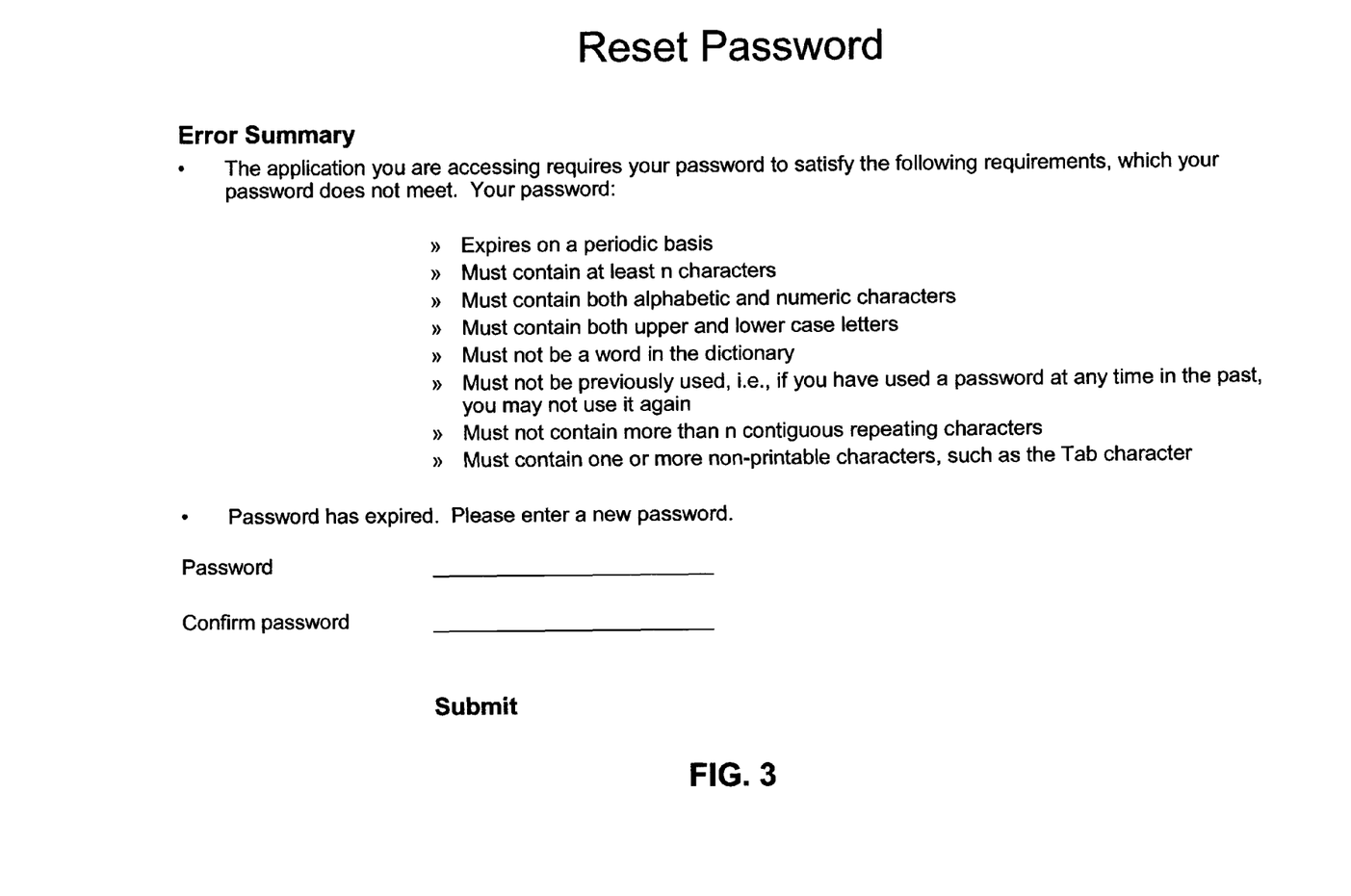
FIG. 3 illustrates a reset password user interface in accordance with an exemplary embodiment.

In an exemplary embodiment, the password must satisfy one or more of the following requirements, depending on the strength level needed: (1) expire on a periodic basis, (2) contain at least "n" characters, (3) contain both alphabetic and numeric characters, (4) contain both upper and lower case letters, (5) not be a dictionary word, (6) not have been used in the past, (7) not contain more than "n" contiguous repeating characters, (contain at least one non-printable characters, such as the "tab" character. FIG. 3 illustrates a reset password user interface in accordance with an exemplary embodiment in a scenario in which all of the preceding requirements must be satisfied to satisfy the strength levels requirements for a new password.

Figure 4:
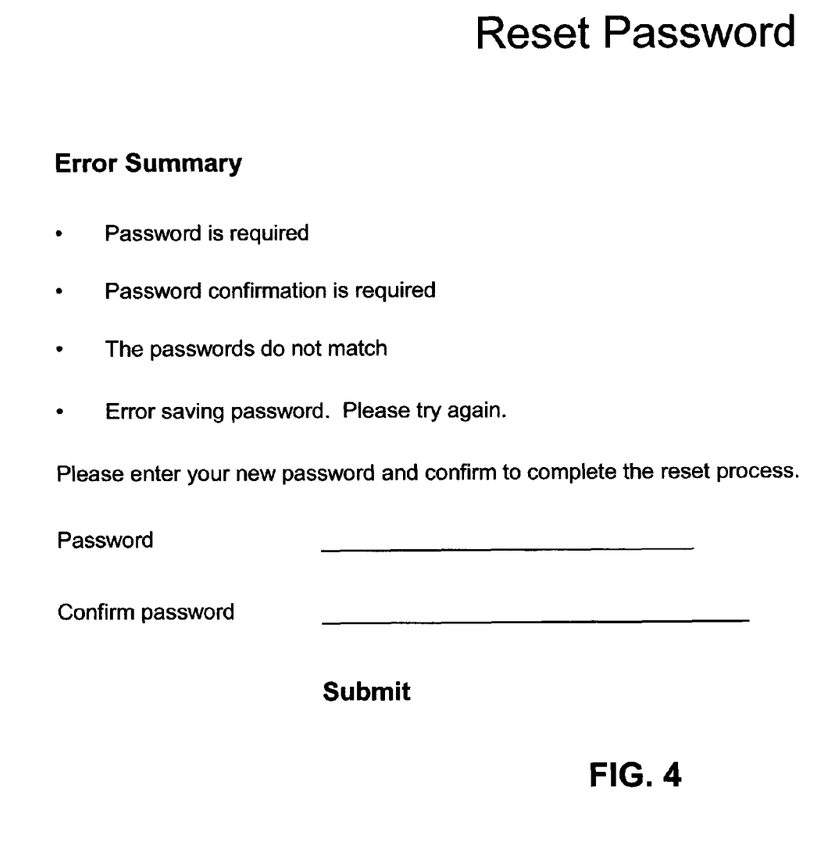
FIG. 4 illustrates another reset password user interface in accordance with an exemplary embodiment.

FIG. 4 illustrates another reset password user interface that the user could receive after clicking the submit button in FIG. 3 if any of the listed conditions occurred when attempting to reset the user's password. Only one of the conditions would actually display on the user interface. The user interface would display "password is required" if the user clicked the submit button without entering a password. The user interface would display "password confirmation is required" if the user did not enter the password in the confirm password field. The user interface would display "the passwords do not match" if the password and confirm password entries did not match. The user interface would display if there was an error in saving the password.

Figure 2:
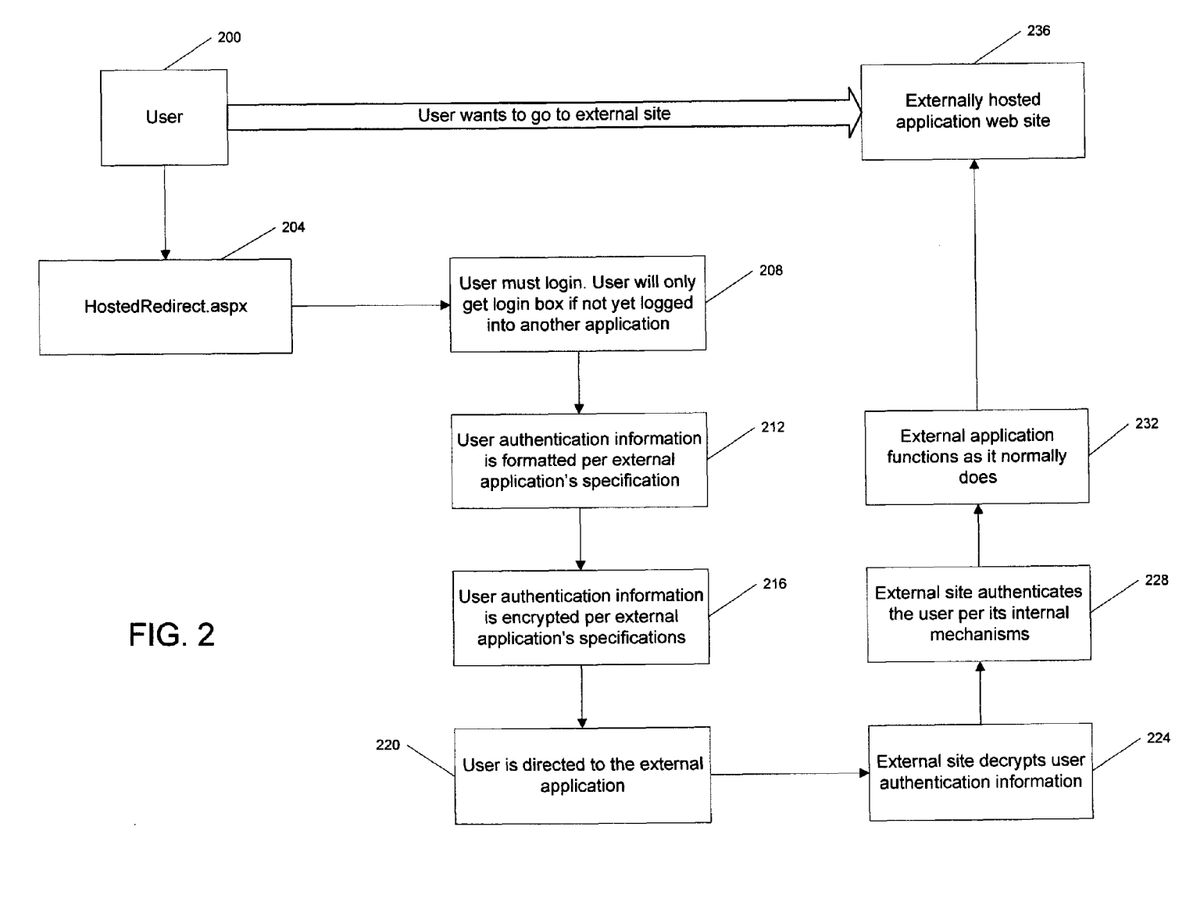
FIG. 2 illustrates processing logic for a transfer page mechanism that translates an enterprise's secure identity into a format required by an external authentication system in accordance with an exemplary embodiment.

There is a transfer page mechanism that can translate the enterprise's secure identity into a format required by external authentication systems. This transfer page mechanism is referred to herein as Hosted Redirect and supports various encryption algorithms, hashes, formats, certificates, etc. that an external site would need to accept a login externally without presenting a login page. FIG. 2 illustrates processing logic for a transfer page mechanism that translates an enterprise's secure identity into a format required by an external authentication system in an exemplary embodiment.

Hosted Redirect is a web page mechanism that facilitates user authentication for externally hosted applications. Users can login using Web Authentication and their familiar username and password. This login mechanism requires that the hosted application implement some custom code to receive a custom token and then log the user in through the normal authentication process.

As illustrated in FIG. 2, user 200 logs in using Web Authentication with username and password and wants to go to an externally hosted application on web site 236. The user is taken to the Hosted Redirect page 204 that is hosted on the enterprise secure web site (e.g., https://WebAuthentication.Enterprise.com). As indicated in block 208, the user must login if not yet logged into another application. The user's authentication information is formatted based on the specification for the external application, as indicated in block 212. The user's authentication is then encrypted based on the external application's specifications as indicated in block 216.

The user is directed to the externally hosted application as indicated in block 220. This is followed in block 224 with the external site decrypting user authentication information. The external site then authenticates the user based on its internal authentication mechanisms, as indicated in block 228. Once the user is authenticated, the external application functions as it would normally function, as indicated in block 232. This completes the process for the user 200 accessing the externally hosted web site 236.

As an example of the use of Hosted Redirect, consider an electronic commerce procurement (e-procurement) site that is hosted off-site (i.e., not on the enterprise's website) on which the enterprise's internal employees would like to utilize their normal usernames and passwords to login. One such e-procurement site used for procurement in the energy industry is that provided by Pantellos Corporation. Pantellos Corporation was launched in 2000 to operate and manage an open, independent marketplace for the purchase of goods and services between the energy industry and its suppliers. In this example implementation, Pantellos can partner with the enterprise to utilize the Hosted Redirect page to meet this requirement. Pantellos could build a page on its site to receive parameters from the enterprise. A user could then click on an e-procurement icon on an enterprise web page. After clicking on the icon, the user is actually taken to https://WebAuthentication.Enterprise.com/HostedRedirect.aspx?app=buy where "buy" is the application name in the Hosted Redirect database. This web page is also referred to herein as the Hosted Redirect page. The user would then login using Web Authentication. If the user has already logged into Web Authentication in the same browser window, the user is not shown the login page again since the user has already been authenticated.

Hosted Redirect then looks up "buy" in the database, creates a custom token according to the configuration for "buy" in the database, and redirects user to the Pantellos site at https://test.pantellos.com/extauth/auth.aspx?co=enterprise&id=<EncryptedCustomToken>&app=buy.

In this example, the Pantellos application would decrypt the ID querystring argument (using the same format and encryption configuration that the enterprise used to encrypt it) and log the user into the e-procurement application.

Redirect Uniform Resource Locator (URL) Parameters

When redirected to the externally hosted application, the following format is used:

https://somehostedapplication.com?co=enterprise&id=<EncryptedCustom Token>&<original querystring arguments>

Querystring Arguments

Query strings are the part of a URL that contains data to be passed to web applications.

The following is a list of query string arguments that could be used in exemplary embodiments:

co—identifies the enterprise as the source of the custom token. This allows the hosted application to reuse the custom login page for other companies.

id—the custom token; formatted and encrypted according to the hosted application's specifications <original querystring arguments>—the contents of the user's original request to the Hosted Redirect page. This allows for the hosted application to accept additional parameters.

Configuration

Figure 5:
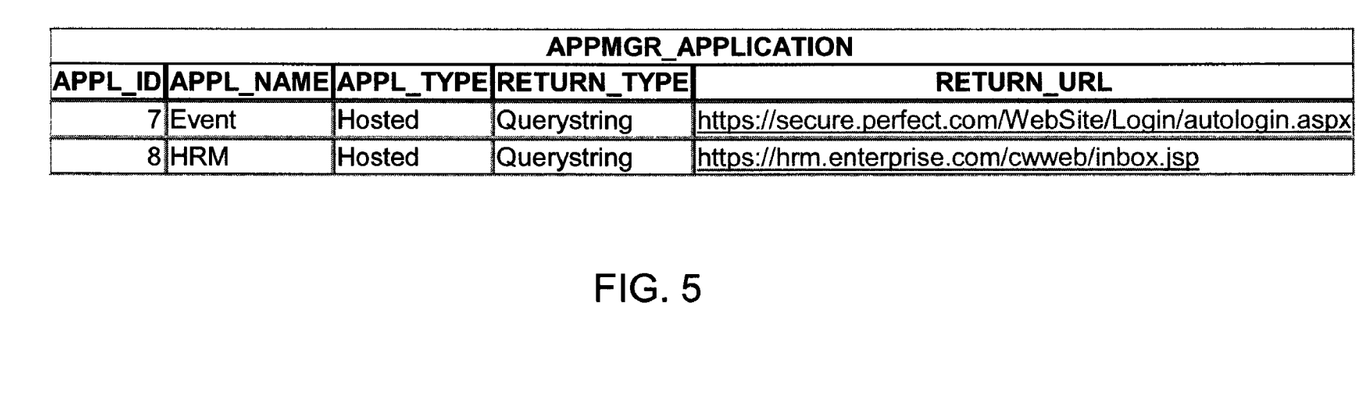
FIG. 5 illustrates a top level database configuration table related to the client web application in accordance with an exemplary embodiment.
Figure 6A:
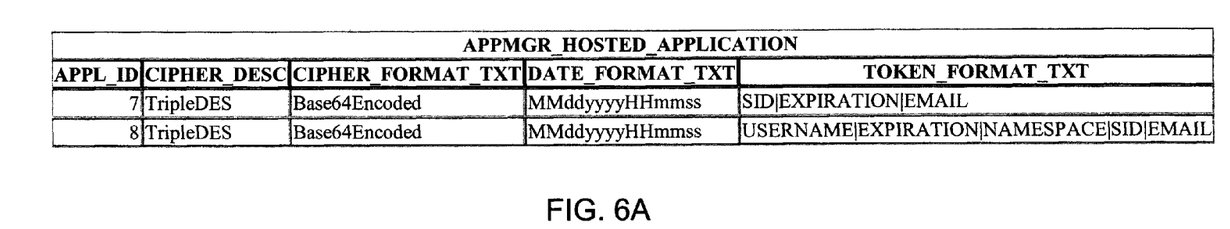
FIGS. 6A-6C illustrate a database configuration table for storing the encryption data used by Hosted Redirect to create the custom token for the requesting web application in accordance with an exemplary embodiment.
Figure 6B:
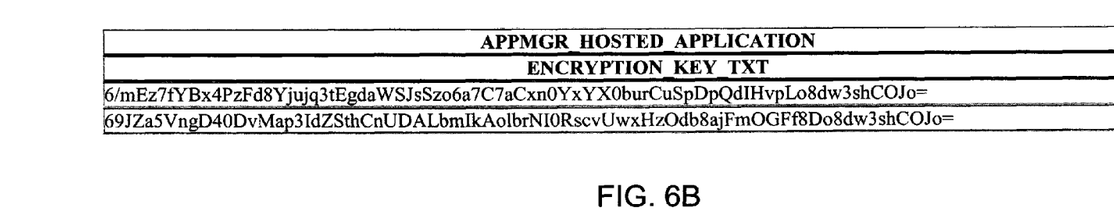
Figure 6C:
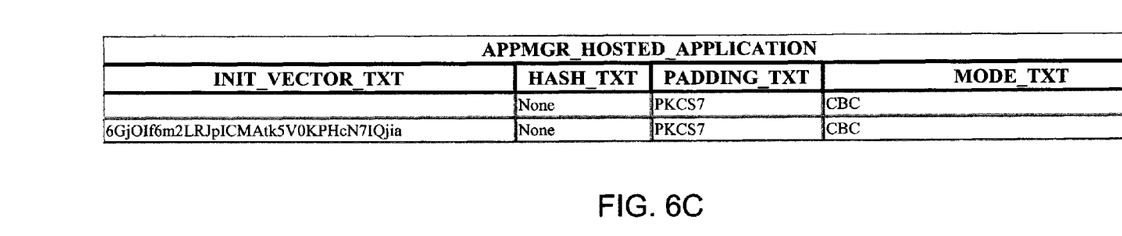

FIG. 5 illustrates an exemplary top level database configuration table related to the client web application. The top level information includes the return URL and the return type. The web page address in the "Return_URL" field is also referred to as the Hosted Redirect page. All parameters for the custom token format and encryption are fully customizable on a per application basis. FIGS. 6A-6C illustrate a database configuration table for storing the encryption data used by Hosted Redirect to create the custom token for the requesting web application. This database configuration table defines the token contents, encryption algorithm, and encryption keys that should be used to build the custom token. Hosted Redirect provides a unique token to each application requiring a custom token. The benefits of having a unique token for each application are increased security and flexibility.

The hosted application can specify the Uniform Resource Locator (URL) and format for the custom token as discussed in the following paragraphs.

URL—the URL of the page on the externally hosted application's site that knows how to handle custom token arguments. This page on the externally hosted application's site must be running with Secure Sockets Layer (SSL).

Custom Token Format—the format of the custom token. For example, the custom token format might be "SID|Expiration" to return the user's Security Identifier (SID) and the time that the user's token expires. The following fields are supported in the custom token in an exemplary embodiment:

SID—user's SID (80 characters). This is the only guaranteed unique identifier.

ShortSID—hashed version of the user's SID (32 characters). This is not guaranteed to be a unique identifier.

SCID—user's enterprise ID (e.g., employee number).

Expiration—UTC timestamp of when the token expires. The use of a UTC timestamp for token expiration is strongly recommended. The hosted site must verify that the custom token has not expired.

Username—user login ID. This is not recommended as a primary key since it is not a unique value; instead, SID or ShortSID should be used.

Namespace—login namespace/domain

FirstName—user's first name

LastName—user's last name

Email—user's e-mail address

The hosted application can also specify the following parameters for encryption:

Cipher—the encryption algorithm to be used. In an exemplary embodiment, available ciphers could include: RC2, DES, TripleDES, Rajindael.

Cipher Format—format of the cipher text. In an exemplary embodiment, available formats could include: Base64Encoded, HexString, Binary.

Hash—the algorithm that produces a one-way digest from a given key. In an exemplary embodiment, available hashes could include: MD5, SHA1, None.

Mode—the cipher block mode to use for encryption. In an exemplary embodiment, available modes could include: CBC, CFB, ECB.

Padding—the type of padding to apply when the message data block is shorter than the full number of bytes needed for a cryptographic operation. In an exemplary embodiment, available padding modes could include: None, PKCS7, Zeroes. As is well known, PKCS7 is a public key cryptographic message syntax standard developed by RSA Laboratories that describes general syntax for data that may have cryptography applied to it, such as digital signatures.

Date Format—format of dates returned in the custom token. All dates are in Universal Coordinated Time. In an exemplary embodiment, the data format might be "MM-dd-yyyy HH:mm:ss".

Encryption Key—the key to be used to encrypt and decrypt the custom token.

Initialization Vector—used to initialize blocks of encrypted text. The initialization vector is typically zero-filled. If specified, it must conform to a fixed size defined by the cipher.

The Encryption Key and Initialization Vector parameters are considered "secrets" and must be protected. Because of this, both are encrypted within the database used for Hosted Redirect.

The hosted application cannot specify the character encoding to use. In exemplary embodiments, ASCII encoding can be used.

The system and method embodiments have been described as computer-implemented processes. It is important to note, however, that those skilled in the art will appreciate that the mechanisms of the disclosed embodiments are capable of being distributed as a computer readable medium in a variety of forms, regardless of the particular type of physical signal bearing media utilized to carry out the distribution. Examples of physical signal bearing media include, without limitation, recordable-type media such as flash drives, portable hard drives, diskettes, and CD ROMs.

The corresponding structures, materials, acts, and equivalents of all means plus function elements in any claims below are intended to include any structure, material, or acts for performing the function in combination with other claim elements as specifically claimed. Those skilled in the art will appreciate that many modifications to the exemplary embodiment are possible without departing from the scope of the invention.

In addition, it is possible to use some of the features of the embodiments described without the corresponding use of the other features. Accordingly, the foregoing description of the exemplary embodiments is provided for the purpose of illustrating the principles of the invention, and not in limitation thereof, since the scope of the invention is defined solely by the appended claims.

What is claimed is:

1. A method for facilitating user authentication for accessing an application hosted on an external web site, comprising the steps of:
    storing a login specification for the application hosted on the external web site in a configuration database;
    receiving a request from a user to access the application on the external web site;
    redirecting the user to a secure web page on an enterprise server to log in to the server for authentication of the user;
    formatting an authentication information for the user in compliance with the login specification for the application hosted on the external web site;
    encrypting the authentication information in compliance with the login specification for the application hosted on the external web site;
    authenticating the user in compliance with the external web site's authentication mechanisms; and
    enabling the user to access the application hosted on the external web site without having to reenter login information.

2. The method for facilitating user authentication for accessing an application hosted on an external web site of claim 1 further comprising decrypting the user authentication information on the external web site.

3. The method for facilitating user authentication for accessing an application hosted on an external web site of claim 1 further comprising generating a security token for the user following a successful authentication of the user by the enterprise server.

4. The method for facilitating user authentication for accessing an application hosted on an external web site of claim 3 further comprising storing the security token in a web browser session for the user.

5. The method for facilitating user authentication for accessing an application hosted on an external web site of claim 3 wherein the security token identifies the user as a valid user to the application hosted on the external web site.

6. The method for facilitating user authentication for accessing an application hosted on an external web site of claim 3 wherein the security token includes a security identifier and an expiration time.

7. The method for facilitating user authentication for accessing an application hosted on an external web site of claim 3 further comprising centrally managing encryption and expiration of the security token by the enterprise server.

8. The method for facilitating user authentication for accessing an application hosted on an external web site of claim 3 further comprising verifying to the application hosted on the external web site that the security token has not expired.

9. The method for facilitating user authentication for accessing an application hosted on an external web site of claim 1 wherein authentication of the user comprises verifying that a user's password provided during login satisfies a password strength level requirement established for applications running on an enterprise web server.

10. The method for facilitating user authentication for accessing an application hosted on an external web site of claim 1 further comprising generating an icon for the application hosted on the external web site and placing the icon on an enterprise web page to enable the user to request access to the application.

11. The method for facilitating user authentication for accessing an application hosted on an external web site of claim 3 further comprising formatting the security token as specified by the application hosted on the external web site.

12. The method for facilitating user authentication for accessing an application hosted on an external web site of claim 11 further comprising storing an encryption key for encrypting the security token for the application hosted on external web sites.

13. A system for facilitating user authentication for accessing an application hosted on an external web site, comprising:
 a memory for storing a login specification for the application hosted on the external web site in a configuration database;
 a processor for executing a plurality of software components, including:
  a component that receives a request from a user to access the application on the external web site;
  a component that redirects the user to a secure web page on an enterprise server to log in to the server for authentication of the user;
  a component that formats an authentication information for the user in compliance with the login specification for the application hosted on the external web site;
  a component that encrypts the authentication information in compliance with the login specification for the application hosted on the external web site; and
  a component that enables the user to access the application hosted on the external web site without having to reenter login information wherein the user is authenticated in compliance with the external web site's authentication mechanisms.

14. The system for facilitating user authentication for accessing an application hosted on an external web site of claim 13 further comprising a component executed on the external web site that decrypts the user authentication information on the external web site.

15. The system for facilitating user authentication for accessing an application hosted on an external web site of claim 13 further comprising a component that generates a security token for the user following a successful authentication of the user by the enterprise server.

16. The system for facilitating user authentication for accessing an application hosted on an external web site of claim 15 further comprising a component that stores the security token in a web browser session for the user.

17. The system for facilitating user authentication for accessing an application hosted on an external web site of claim 15 further comprising a component that centrally manages encryption and expiration of the security token by the enterprise server.

18. The system for facilitating user authentication for accessing an application hosted on an external web site of claim 15 further comprising a component that verifies to the application hosted on the external web site that the security token has not expired.

19. The system for facilitating user authentication for accessing an application hosted on an external web site of claim 13 further comprising a component that verifies that a user's password provided during login satisfies a password strength level requirement established for applications running on an enterprise web server.

20. The system for facilitating user authentication for accessing an application hosted on an external web site of claim 13 further comprising a component that generates an icon for the application hosted on the external web site and places the icon on an enterprise web page to enable the user to request access to the application.

21. The system for facilitating user authentication for accessing an application hosted on an external web site of claim 15 further comprising a component that formats the security token as specified by the application hosted on the external web site.

22. The system for facilitating user authentication for accessing an application hosted on an external web site of claim 15 further comprising a database that stores an encryption key for encrypting the security token for the application hosted on the external web site.

23. A non-transitory computer readable medium for facilitating user authentication for accessing an application hosted on an external web site when operated on a computer system, comprising:
 program instructions that store a login specification for the application hosted on the external web site in a configuration database;
 program instructions that receive a request from a user to access the application on the external web site;
 program instructions that redirect the user to a secure web page on an enterprise server to log in to the server for authentication of the user;
 program instructions that format an authentication information for the user in compliance with the login specification for the application hosted on the external web site;
 program instructions that encrypt the authentication information in compliance with the login specification for the application hosted on the external web site; and
 program instructions that enable the user to the application hosted on the external web site without having to reenter login information wherein the user is authenticated in compliance with the external web site's authentication mechanisms.

24. The non-transitory computer readable medium for facilitating user authentication for accessing an application hosted on an external web site of claim 23 further comprising program instructions executed on the external web site that decrypt the user authentication information on the external web site.

25. The non-transitory computer readable medium for facilitating user authentication for accessing an application hosted on an external web site of claim 23 further comprising program instructions that generate a security token for the user following a successful authentication of the user by the enterprise server.

26. The non-transitory computer readable medium for facilitating user authentication for accessing an application hosted on an external web site of claim 25 further comprising program instructions that store the security token in a web browser session for the user.

27. The non-transitory computer readable medium for facilitating user authentication for accessing an application hosted on an external web site of claim 25 further comprising program instructions that centrally manage encryption and expiration of the security token by the enterprise server.

28. The non-transitory computer readable medium for facilitating user authentication for accessing an application hosted on an external web site of claim 25 further comprising program instructions that verify to the application hosted on the external web site that the security token has not expired.

29. The non-transitory computer readable medium for facilitating user authentication for accessing an application hosted on an external web site of claim 23 further comprising program instructions that verify that a user's password provided during login satisfies a password strength level requirement established for applications running on an enterprise web server.

30. The non-transitory computer readable medium for facilitating user authentication for accessing an application hosted on an external web site of claim 23 further comprising program instructions that generate an icon for the application hosted on the external web site and place the icon on an enterprise web page to enable the user to request access to the application.

31. The non-transitory computer readable medium for facilitating user authentication for accessing an application hosted on an external web site of claim 25 further comprising program instructions that format the security token as specified by the application hosted on the external web site.

32. The non-transitory computer readable medium for facilitating user authentication for accessing an application hosted on an external web site of claim 25 further comprising program instructions that store an encryption key for encrypting the security token for the application hosted on the external web site.

* * * * *